United States Patent
Yoon et al.

(10) Patent No.: US 8,412,282 B2
(45) Date of Patent: Apr. 2, 2013

(54) HAPTIC GENERATION METHOD AND SYSTEM FOR MOBILE PHONE

(75) Inventors: Sang Hyeon Yoon, Seoul (KR); Ki Tae Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1162 days.

(21) Appl. No.: 11/958,805

(22) Filed: Dec. 18, 2007

(65) Prior Publication Data

US 2008/0153554 A1    Jun. 26, 2008

(30) Foreign Application Priority Data

Dec. 21, 2006 (KR) .................... 10-2006-0131774
Feb. 1, 2007   (KR) .................... 10-2007-0010461

(51) Int. Cl.
    *H04M 1/00*    (2006.01)
(52) U.S. Cl. ............ 455/567; 455/466; 345/156; 710/72
(58) Field of Classification Search ................ 455/66.1, 455/90.1, 90.3, 412.1, 412.2, 413, 414.1, 455/414.2, 414.3, 414.4, 415, 418–420, 466, 455/502, 517, 550.1, 556.2, 566, 567, 575.1; 340/7.58, 7.59, 7.6, 7.61, 7.62, 407.2; 345/173, 345/158, 156; 715/702; 710/72

See application file for complete search history.

(56) References Cited

U.S. PATENT DOCUMENTS

| | | | |
|---|---|---|---|
| 6,418,323 | B1 | 7/2002 | Bright et al. |
| 6,785,563 | B2 * | 8/2004 | Tsukamoto ................ 455/567 |
| 6,850,782 | B2 | 2/2005 | Bright et al. |
| 6,963,762 | B2 * | 11/2005 | Kaaresoja et al. ........... 455/567 |
| 6,985,519 | B1 * | 1/2006 | Barnes et al. ............... 375/220 |
| 7,148,875 | B2 * | 12/2006 | Rosenberg et al. .......... 345/156 |
| 7,263,374 | B2 * | 8/2007 | Fan et al. .................. 455/456.4 |
| 7,409,428 | B1 * | 8/2008 | Brabec et al. .............. 709/206 |
| 7,765,333 | B2 * | 7/2010 | Cruz-Hernandez et al. ...... 710/5 |
| 7,779,166 | B2 * | 8/2010 | Grant et al. .................... 710/5 |
| 2001/0044328 | A1 | 11/2001 | Tsukamoto |
| 2002/0136368 | A1 * | 9/2002 | Aoki et al. ................ 379/88.12 |
| 2003/0067440 | A1 * | 4/2003 | Rank ........................... 345/156 |
| 2006/0066569 | A1 * | 3/2006 | Eid et al. ..................... 345/156 |
| 2006/0246956 | A1 * | 11/2006 | Park et al. .................... 455/566 |
| 2006/0258378 | A1 * | 11/2006 | Kaikuranata ................ 455/466 |
| 2007/0176742 | A1 * | 8/2007 | Hofmann et al. ............. 340/7.6 |

FOREIGN PATENT DOCUMENTS

| | | | |
|---|---|---|---|
| DE | 101 61 133 | | 12/2001 |
| EP | 1 260 949 | | 5/2002 |
| GB | 2416962 A | * | 2/2006 |
| JP | 2000-049956 | | 2/2000 |
| JP | 2001-148725 | | 5/2001 |

* cited by examiner

*Primary Examiner* — Mahendra Patel
(74) *Attorney, Agent, or Firm* — The Farrell Law Firm, P.C.

(57) ABSTRACT

A haptic generation method and system for a mobile phone is provided. A vibration event is detected in an operation mode. A vibration code corresponding to the vibration event is retrieved from a mapping table. A control message containing the vibration code is generated, and the control message is transmitted to at least one destination mobile phone.

20 Claims, 9 Drawing Sheets

HAPTIC GENERATION METHOD AND SYSTEM FOR MOBILE PHONE

PRIORITY

This application claims priority to applications filed in the Korean Intellectual Property Office on Dec. 21, 2006 and assigned Serial No. 2006-0131774, and on Feb. 1, 2007 and assigned Serial No. 2007-0010461, the disclosures of which are incorporated herein by reference.

BACKGROUND OF THE INVENTION

1. Field of the Invention

The present invention relates generally to a mobile phone, and more particularly, to a haptic generation method and system for a mobile phone.

2. Description of the Related Art

Due to the widespread use of mobile phones and the increase in wireless access users, telecommunication carriers have been developing new services in order to satisfy various subscriber requirements. The major requirements include wireless Internet access, Short Message Service (SMS), Multimedia Messaging Service (MMS), Concurrent Multiple Service (CMS), and multimedia services.

Recently developed mobile phones provide the users with attractive functions such as personal information management, data communication with personal computers, and internet access, as well as the basic mobile voice communication. Mobile phones are becoming multi-functional devices that incorporate multimedia communication and playback functions, camera functions, digital broadcast receiver functions, etc.

Mobile phones have been developed that focus on visual and auditory processing reinforcement. However, most of the conventional mobile phones are limited in haptic processing capability for transmitting tactile effect.

Accordingly, there has been a need to develop a haptic feedback technique for enriching communication with tactile output as well as visual and auditory outputs.

SUMMARY OF THE INVENTION

The present invention has been made to address at least the above problems and/or disadvantages, and to provide at least the advantages described below. Accordingly, an aspect of the present invention provides a haptic generation method and system for a mobile phone that are capable of enriching communication with tactile feelings as well as visual and auditory expressions.

Another aspect of the present invention provides a haptic generation method and system for a mobile phone that are capable of transmitting a vibration code representing a vibration event supposed to be occur in a specific situation to a recipient phone.

An additional aspect of the present invention provides a haptic generation method and system for a mobile phone that are capable of providing a tactile feedback such as vibration event to a user in response to a vibration code generating at a specific situation.

A further aspect of the present invention provides a haptic generation method and system for a mobile phone that are capable of transmitting a vibration code representing a vibration event supposed to be occurred at a specific situation to a counterpart tactile feedback-enabled mobile phone in a communication mode so as to share the tactile sense with the counterpart mobile phone user.

Another further aspect of the present invention provides a haptic generation method and system for a mobile phone that are capable of generating a vibration in response to a detection of vibration code corresponding to a vibration event in a multimedia mode or an idle mode.

Additionally, an aspect of the present invention provides a haptic generation method and system for a mobile phone that are capable of transmitting a vibration code corresponding to a vibration event occurred in a multimedia mode or an idle mode to an specific mobile phone.

Another aspect of the present invention provides a haptic generation method and system for a mobile phone that are capable of transmitting a text message containing a vibration code in its header or body field to a receiving mobile phone.

Another aspect of the present invention provides a haptic generation method and system for a mobile phone that are capable of alarming a reception of a text message with a tactile output having a specific vibration pattern/level that are indicated by a vibration code contained in a header or body of the received text message.

Finally, an aspect of the present invention provides a haptic generation method and system for a mobile phone that are capable of presenting a tactile output having a specific vibration pattern/level indicated by a character string contained in a content of a received text message.

According to one aspect of the present invention, a haptic generation method for a mobile phone includes detecting a vibration event in an operation mode. A vibration code corresponding to the vibration event from a mapping table is received. A control message containing the vibration code is generated. The control message is transmitted to at least one destination mobile phone.

According to another aspect of the present invention, a haptic generation method for a mobile phone includes detecting a vibration event in a multimedia mode. A vibration pattern and a vibration level corresponding to the vibration event are received. Recipient information of an ongoing playback multimedia file is checked. The multimedia file containing information on the vibration pattern and vibration level is transmitted to a recipient mobile phone on the basis of the recipient information.

According to a further aspect of the present invention, a haptic generation method for a mobile phone includes detecting a vibration information insertion command in a text message composition mode. Inputting vibration information is requested, when a vibration information insertion command is detected. A text message containing vibration information inputted by a user is generated. The text message is transmitted to at least one recipient mobile phone.

According to another further aspect of the present invention, a haptic generation method for a mobile phone includes receiving a text message in an operation mode. A text carried by the text is displayed in a sliding manner in response to a read command. It is checked whether the text contains at least one character string registered to a mapping table from the text. A vibration mapped to the at least one registered character string at a time is generated when the character string appears on a screen, when at least one registered character string is detected.

According to another aspect of the present invention, a haptic generation method for a mobile phone includes setting, at a sending mobile phone, vibration information on at least one character string of a text while generating a text message. The text message is transmitted to a receiving mobile phone. The text message is received at the receiving mobile phone. The text of the text message is displayed in response to a message reading command. The vibration information set for the at least one character string is extracted. A vibration in a vibration pattern/level indicated by the vibration information is generated.

According to a further aspect of the present invention, a haptic generation method for a mobile phone includes receiving a text message in an operation mode. It is determined whether vibration information is contained in a header of the text message. A vibration for alerting a reception of the text message is output, when vibration information is contained.

According to yet another aspect of the present invention, a mobile phone includes a radio frequency unit for establishing communication channel with an access network for exchanging voice, text message, and a vibration code corresponding to a vibration event. The mobile phone also includes an input unit for receiving control commands associated with a haptic generation function and a touch input or key input for generating vibration event. Additionally, the mobile phone includes a memory unit for storing data generated by a haptic application program and parameters associated with the haptic generation function; a vibration driving unit for generating a vibration corresponding to the vibration event, and a control unit for controlling the haptic generation function and generation of the vibration.

BRIEF DESCRIPTION OF THE DRAWINGS

The above and other objects, features and advantages of the present invention will be more apparent from the following detailed description when taken in conjunction with the accompanying drawings, in which.

DETAILED DESCRIPTION OF THE PREFERRED EMBODIMENTS

Preferred embodiments of the present invention are described in detail with reference to the accompanying drawings. The same reference numbers are used throughout the drawings to refer to the same or like parts. Detailed descriptions of constructions or processes known in the art may be omitted to avoid obscuring the subject matter of the present invention.

Although the invention is described in detail with reference to specific embodiments thereof, it is to be understood that variations that are functionally equivalent are within the scope of this invention. Various modifications of the invention in addition to those shown and described herein will become apparent to those skilled in the art from the following description and accompanying drawings. Such modifications are intended to fall within the scope of the appended claims.

In the following, a mobile phone enabled by haptic output function as well as visual and auditory output functions, and control method thereof is provided. More particularly, a mobile phone according to an embodiment of the present invention generates a vibration code reflecting a tactile feeling and transmits the vibration code to the receiving mobile phone and the receiving mobile phone, which generates a type of vibration indicated by the vibration code such that the user can share the tactile feeling with the recipient.

Also, a mobile phone according to an embodiment of the present invention generates a text message containing a vibration code in its header or body field. A mobile phone according to an embodiment of the present invention alarms a reception of a text message by extracting a vibration code contained in a header or body field of the received text message and generates a vibration having a pattern and level indicated by the vibration code. Also, the mobile phone according to an embodiment of the present invention extracts a vibration code contained in a body field of a received text message and generates a vibration having a pattern and level indicated by the vibration code.

Although the haptic generation method and system are described in association with a mobile phone in the following, the present invention is not limited to the mobile phone.

For example, the haptic generation method and system can be applied to various kinds of mobile terminals such as a cellular phone, a portable digital broadcast receiver, a Personal Digital Assistant (PDA), a Smartphone, International Mobile Telecommunication 2000 (IMT-2000) terminal including Wideband Code Division Multiple Access (WCDMA) terminal and CDMA 2000 terminal, a mobile Internet Protocol (IP) phone, a Portable Multimedia Player (PMP), an MP3 player, a portable computer including laptop and palmtop computers, and their functional equivalents.

Figure 1:
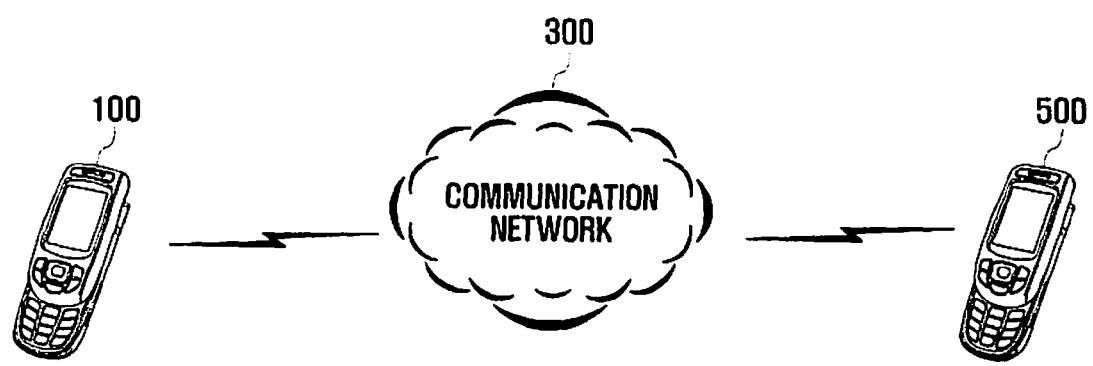
FIG. 1 is a schematic diagram illustrating a mobile communication system including mobile phones equipped with a haptic generation system according to an embodiment of the present invention.

FIG. 1 is a schematic diagram illustrating a mobile communication system including mobile phones equipped with a haptic generation system according to an embodiment of the present invention.

Referring to FIG. 1, the mobile communication system includes a communication network 300 and a pair of mobile phones 100 and 500 communicating with each other via the communication network 300. The first mobile phone 100 is a sending mobile phone, which transmits a vibration code, and the second mobile phone 500 is a receiving mobile phone, which receives the vibration code.

The sending mobile phone 100 and the receiving mobile phone 500 can communicate with each other in voice and data communication sessions through the communication network 300. The sending mobile phone 100 and the receiving mobile phone 500 are named as such for simplifying the explanation of the present invention. However, their structures and functions are identical with each other and their roles can be switched.

In the following, the sending mobile phone 100 generates a vibration code and transmits the vibration code to the receiving mobile phone 500. The receiving mobile phone 500 receives the vibration code and generates vibration indicated by the vibration code.

The sending mobile phone 100 monitors to detect a haptic function activation command input by its user and activates the haptic function in a current operation mode (for example, a communication mode, multimedia mode, and standby mode) in response to the haptic function activation command. Once the haptic function is activated, the sending mobile phone 100 detects a vibration event (for example, in signal input by a touch event or a key event for vibration) and generates a vibration code corresponding to the vibration event.

If a vibration event is detected, the sending mobile phone 100 checks a vibration pattern assigned for the vibration code and outputs a vibration according to the vibration pattern. The sending mobile phone 100 also converts the vibration code into a control signal of a specific message format and transmits the control signal to at least one receiving mobile phone 500.

The sending mobile phone 100 can transmit the vibration code by means of a text message. For example, the sending mobile phone 100 inserts the vibration code into a header or other field of a text message to be transmitted to the receiving mobile phone 500. The vibration code can be inserted into a content of the text message.

The vibration information including vibration event, vibration code, and vibration pattern are explained in detail with reference to table 1. The sending mobile phone 100 can be configured to vibrate or not by an option preset in a haptic function setting screen. The haptic function setting procedure is described in detail with reference to FIG. 2.

The communication network 300 receives a control message containing the vibration code from the sending mobile phone 100 and forwards the control message to at least one receiving mobile phone 500 located within its service area with reference to destination information of the control message. The message delivery procedure is described in detail with reference to FIG. 2.

When the control message is a text message, the communication network 300 transmits the text message to at least one receiving mobile phone 500 indicated by destination information contained within the text message. The text message contains the vibration information in the header or other specific field in a specific code format. The vibration information is added for transmitting a tactile expression.

The communication network 300 may composed of at least one Base Station (BS), a Base Station Controller (BSC), a Mobile Switching Center (MSC), a Home Location Register (HLR), and an information server such as a Short Message Service Center (SMSC).

With such structure, the communication network 300 supports the wireless communication between the mobile phones 100 and 500. For example, the communication network 300 supports a communication channel between the sending mobile phone 200 and the receiving mobile phone 500 and processes the voice and data exchanged between the two mobile phones 100 and 500. The communication network 300 also provides support for establishing multimedia communication channels (e.g., traffic channels) between the two mobile phones 100 and 500 such that the multimedia packets including text message and still and motion pictures can be exchanged through the multimedia communication channel. More particularly, the communication network 300 supports the CMS such that the mobile phones 100 and 500 can exchange the text messages and still and motion pictures through separate channels during a voice communication session.

The communication channel can be established in accordance with the communication technology adapted to the communication network. The communication network is composed of at least one of CDMA, Frequency Division Multiple Access (FDMA), Time Division Multiple Access (TDMA), WCDMA, Universal Mobile Telecommunication System (UMTS), Orthogonal Frequency Division Multiple Access (OFDMA), Wireless Broadband Internet (WiBro) systems.

The receiving mobile phone 500 receives the control message containing the vibration code forwarded by the communication network 300 and extracts the vibration code from the control message if its tactile feedback function is activated. After extracting the vibration code, the receiving mobile phone 500 retrieves a vibration pattern matched to the vibration code from a mapping table and outputs a vibration according to the vibration pattern.

When receiving a text message via the communication network 300, the receiving mobile phone 500 determines whether a vibration code is contained in the header or another specific field of the text message. If a vibration code is detected, the receiving mobile phone 500 checks the vibration pattern/level indicated by the vibration code and then outputs a vibration according to the vibration pattern/level for alarming the reception of the text message.

If a text message open command is detected, the receiving mobile phone 500 displays the text message. The receiving mobile phone checks whether a character string is registered with a vibration pattern and outputs, if a character string registered with a vibration pattern is detected, a vibration according to the vibration pattern.

As described above, the haptic generation method and system of the present invention allows tactile communication in addition to the conventional visual and auditory communication, thereby delivering tactile feelings as well as visual and auditory expressions, resulting in enriching communication.

Although the mobile communication system depicted in FIG. 1 shows a communication network bridging two mobile phones, the present invention is not limited to such configuration. For example, the haptic generation method and system of the present invention can be applied to a mobile communication system composed of a plurality fixed and mobile terminals such that the mobile communication network delivers the vibration code received form a sending mobile terminal to multiple receiving mobile terminals simultaneously.

Also, the sending mobile phone 100 can be configured to request a call to a phone number of the receiving mobile phone 500 with a vibration code (for example, xxx011-123-4567 or 011-123-4567). In such case, the communication network 300 transmits a call request message having the vibration code to the receiving mobile phone 500. Accordingly, the receiving mobile phone 500 extracts the vibration code from the call request message and outputs a vibration according to the vibration pattern/level indicated by the vibration code for alarming an incoming call. By mapping the vibration code to different vibration patterns/levels, the sending user can deliver emotional expression to the recipient.

The mobile phone can be provided with a vibration code generation part, vibration output part, and vibration information storage part. A mobile phone equipped with a haptic feedback system according to an embodiment of the present invention is described hereinafter.

Figure 2:
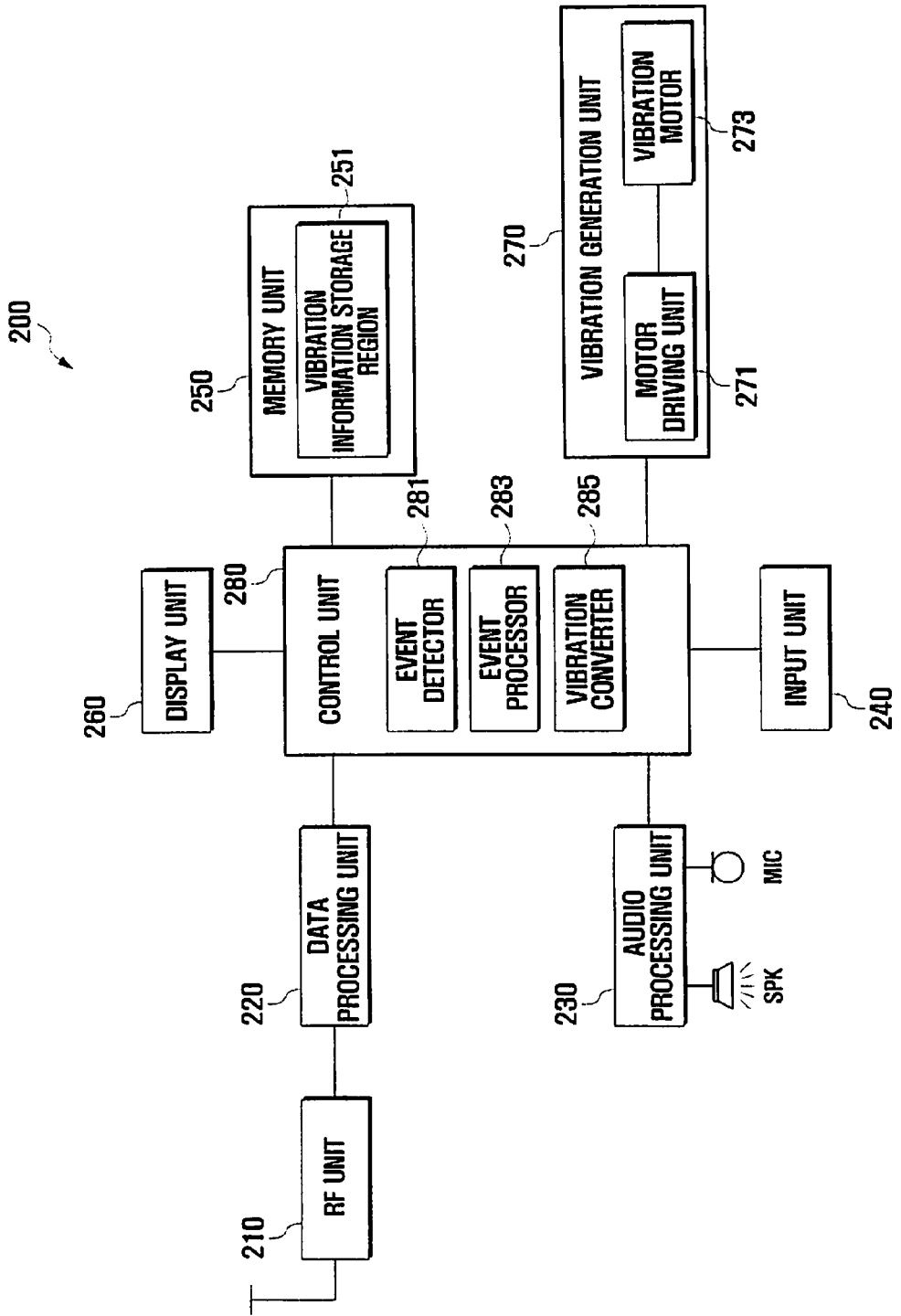
FIG. 2 is a block diagram illustrating a configuration of a mobile phone equipped with a haptic feedback system according to an embodiment of the present invention.

FIG. 2 is a block diagram illustrating a configuration of a mobile phone equipped with a haptic feedback system according to an embodiment of the present invention.

A mobile phone 200 of FIG. 2 can communicate with another fixed or mobile phone and operates as a sending mobile phone 100 and receiving mobile phone 500 of FIG. 1.

In a case of operating in a sending mode, the mobile phone 200 activates the haptic function according to a user command, generates a vibration code according to a vibration event, and transmits the vibration code to at least one recipient.

In a case of operation in a receiving mode, the mobile phone 200 receives the vibration code forwarded by a communication network and output a vibration corresponding to the vibration code.

Referring to FIG. 2, the mobile phone 200 includes a radio frequency (RF) unit 210, a data processing unit 220, an audio processing unit 230, an input unit 240, a memory unit 250, a display unit 260, a vibration generation unit 270, and a control unit 280.

The memory unit 250 includes a vibration information storage region 251, and the control unit 280 includes an event detector 281, an event processor 283, and a vibration converter 285.

The RF unit 210 is responsible for an RF communication of the mobile phone 200. For example, the RF unit 210 establishes a communication channel with the communication network for data and voice communications with another mobile phone. The RF unit 210 includes an RF transmitter for up-converting and amplifying a transmission signal and an RF receiver for low-noise amplifying and down-converting the received signal.

The data processing unit 220 is responsible for processing the voice data received from the audio processing unit 230, alphanumeric data input by the input unit 240, and data (for example, vibration code, control message, and text message) received and to be transmitted through the RF unit 210. The data processing unit 220 includes a transmitter for performing encoding and modulation on the signal to be transmitted through RF unit 210 and a receiver for performing demodulation and decoding on the signal received through the RF unit 210. The data processing unit 220 may include a modem and a codec. The codec is provided with a data codec for processing packet data and an audio codec for processing audio signal including voice.

The audio processing unit 230 processes audio signal received from the data processing unit 220 so as to be output as an audible sound wave through a speaker (SPK) and processes the sound wave input through a microphone (MIC) so as to be output audio signal to the data processing unit 220.

The input unit 240 is provided with a plurality of alphanumeric keys for inputting number and text information and various function keys for generating control command for executing corresponding functions. The input unit 240 can be provided with at least one of touchpad, touchscreen, and a keypad. The input unit 240 can further includes navigation keys, volume keys, and various hot keys. In this embodiment, the input unit 240 is configured such that the haptic function can be set through key manipulation on the keypad, touchpad, or touchscreen. In a case that the haptic function is activated, the vibration event for generation vibration code can be input using the function keys provided on the keypad, touchpad, or touchscreen.

The memory unit 250 stores application programs for executing functions of the mobile phone (particularly, the application programs for controlling the haptic function) and user data (for example, photo, motion picture, and text message) generated by the user or received from outside. The memory unit 250 also stores the parameters associated with the haptic function. The memory unit 250 can be provided with at least one buffer for temporarily storing the user data generated while the application programs are operating.

The memory unit 250 stores the vibration information such as vibration events, vibration codes, vibration patterns, vibration levels, and character strings for generating various types of vibrations when the haptic function is activated. For this purpose, the memory unit 250 includes the vibration storage region 251. Preferably, the vibration information is stored in the form a mapping table as Table 1.

TABLE 1

| Event | Behavior | Vibration Code | Expression | Vibration Pattern | Character String |
|---|---|---|---|---|---|
| Touch Event 1 | Rub | 0000 | Love | Long: weak-weak-middle | Love |
| Touch Event 2 | Touch | 0001 | Anger | Short: strong-strong | Abrupt |
| ... | ... | ... | ... | ... | ... |
| Touch Event N | Circle | 0100 | Impression | Short: weak-middle | Impression |
| Number Key 1 | Key Input | 0111 | Greeting 1 | Short: strong | Good . . . |
| Number Key 2 | Key Input | 1000 | Greeting 2 | Short: middle | Hi |
| ... | ... | ... | ... | ... | ... |
| Number Key 0 | Key Input | 1111 | Sleepiness | Long: weak-middle | Sleepy |
| ... | ... | ... | ... | ... | ... |

As shown in Table 1, the mapping table is composed of an event field indicating vibration event (for example, touch event and key event) input by a user, a behavior field for indicating behavior required for generating the event, a vibration code field for indicating a vibration code corresponding the vibration event, a vibration pattern field for indicating a vibration output pattern corresponding to the vibration event and code, and a character string field for indicating the character string matched to the vibration event.

Table 1 is only an example of a mapping table for simplifying the explanation of the haptic generation method. Accordingly, the present invention is not limited to Table 1 and can be in variety of different manners.

The mapping table can be edited by adding records and modifying the parameters of each record. Preferably, the mapping table should be shared by the sending and receiving mobile phones. The mapping table can be provided as an embedded database or downloaded from a server for enabling the haptic function of the mobile phone. Preferably, the server notifies the mobile phones of an update whenever the mapping table is modified.

The vibration code can be converted to other types of codes for use in other applications such as Short Message Service (SMS) and Multimedia Messaging Service (MMS), or it may be converted to a command signal.

Although not shown in Table 1, the mapping table can include an emoticon field. Also, the mapping table can be configured such that the emoticon can be filled within the character string field.

Preferably, the message or command carrying the vibration information includes an identifier or vibration code for indicating that the message or command carries control information. Preferably, the vibration code is transmitted in the form of a control message or a specific code.

Also, the vibration code can be transmitted together with called terminal information (for example, the phone number of the called mobile phone). In this case the control message contains the called terminal information. In the following, it is assumed that the control message is transmitted without called terminal information for simplifying the explanation.

The display unit 260 displays various application screens (for example, communication status screen, text message screen, menu screens, still and motion picture playback screen, etc.) and information on the key manipulation and enabled function status indicators under the control of the control unit 280. The display unit 260 can be implemented with a Liquid Crystal Display (LCD). In a case that the LCD incorporates a touchscreen function, the display unit 260 can be acts as a part of the input unit.

The vibration generation unit 270 generates a vibration under the control of the control unit 280 and includes a motor driving module 271 and a vibration motor 273.

The motor driving module 271 generates a voltage form driving the vibration motor 273. That is, the motor driving module 271 receives a control signal generated by the control unit 280 according to a vibration event and outputs a predetermined level of voltage to the vibration motor 273 in response to the control signal. In more detail, the motor driving module 271 adjusts the size of current applied to the vibration motor 273 to differentiate the vibration pattern/level through a gain control of the vibration motor 273. In another embodiment, the vibration generation unit 270 can be controlled through a pin such as General Purpose Input/Output (GPIO) port of the control unit 280. In this case, the control unit 280 can adjust the vibration level by controlling the current flowing through the pin.

The vibration motor 273 generates a vibration of which frequency and strength level are adjusted by the motor driving module 271 controlling the current. The vibration motor 273 can be implemented one or more motor modules according to the configuration of the mobile phone 200.

The control unit 280 controls generation operations of the mobile phone 200 and signaling among the internal components. That is, the control unit 280 controls the cooperative signaling among the data processing unit 220, audio processing unit 230, input unit 240, memory unit 250, display unit 260, and vibration generation unit 270. The control unit 280 can integrate the data processing unit 220.

More particularly, the control unit 280 controls the activation/deactivation and operation of the haptic function. The control unit 280 generates the vibration code according to the vibration event input while the haptic function is activated. The control unit 280 controls the vibration generation unit 270 to generate vibration corresponding to the vibration code and transmits the vibration code to a recipient mobile phone.

When receiving a control message containing a vibration code or a text message containing a specific character string, the control unit 280 also retrieves vibration pattern/level corresponding to the vibration code or the character string and controls the vibration generation unit 270 to generate the vibration.

If a text message is received, the control unit 280 extracts the vibration information or a predetermined command code from a header or other predetermined field of the text message. If a vibration information or command code is detected within the header or other field, the control unit 280 controls the vibration generation unit 270 to generate a vibration with a specific vibration pattern/level indicated by the vibration information or command code for alarming the incoming text message.

In a case of composing an outgoing text message, the control unit 280 sets vibration information with at least one specific character string within the text message according to user commands. This message containing at least one character string implying the vibration command is transmitted to at least one recipient terminal with reference to the destination information of the text message.

When a character string matched a vibration command appears on the screen while an incoming text message is opened to be read, the control unit 280 allows the vibration generation unit 270 to generate vibration in a vibration pattern/level indicated by the vibration command.

The control unit 280 arranges the character strings constituting the incoming text message so that they appear in a sequential order. The control unit 280 compares each character string appearing on the screen to the reference character strings registered to the mapping table and generates, if a registered character string is retrieved, the vibration corresponding to the retrieved character string in a predetermined vibration pattern/level.

The control unit 280 includes an event detector 281, an event processor 283, and a vibration converter 285.

The event detector 281 detects events (for example, outgoing/incoming call request and text message transmission/reception event) occurred while the mobile phone 200 operates. More particularly, the event detector 281 detects a haptic function activation command while the mobile phone 200 operates in a specific operation mode such as communication mode, multimedia mode, and standby mode. After the haptic function is activated, the event detector 281 can detect vibration events such as touch event and key input event for setting a vibration.

If a control message containing a vibration code or a text message containing a specific character string is received, the event detector 281 checks whether the haptic function is activated. The haptic function can be set to be on or off by the user.

In a case of composing a text message, the event detector 281 determines whether a vibration information or command code insertion command is input after the text message composition completes. In a case of receiving an incoming text message, the event detector 281 checks whether a vibration information or command code is contained in a header or a predetermined field of the incoming text message.

The event processor 283 is responsible for processing the events detected by the event detector 281. If the haptic function activation command is detected by the event detector 281, the event processor 283 activates the haptic function. If a vibration event is detected by the event detector 281 while the haptic function is activated, the event processor 283 analyzes the vibration event and outputs a vibration code generated according to the analysis result to the vibration converter 285.

The event processor 283 also generates a control message to enable extracting the vibration code and converting the vibration code into a control message in a specific application format such as SMS and MMS. The event processor 283 processes the control message to be transmitted to the recipient mobile phone under the control of the control unit 280. The control unit 280 controls such that a channel to the communication network is established for transmitting the control message. The control message can be transmitted through a traffic channel provided by CMS and only the vibration code is transmitted in the form of a simple command. The control message transmission can be performed through any air channel and in any transmission scheme.

If the event detector 281 detects a command for inserting vibration information or command code within the text message, the event processor 283 inserts vibration information or command code indicated by the command into the header or a specific field of the text message.

If the event detector 281 detects a vibration information or command code within a received text message, the event processor 283 generates a vibration of which pattern and level are indicated by the vibration information or command code. In this manner, the mobile phone 200 can notify the user of the incoming message with an emotional expression.

The vibration converter 285 generates a control signal corresponding to the vibration pattern/level and transfers the control to the vibration generation unit 270 such that the vibrating generation unit 270 generates a vibration on the basis of the control signal.

Although the mobile phone is schematically depicted in focusing on the function associated with the present invention in FIG. 2, the present invention is not limited to the mobile phone having such configuration. For example, the mobile phone 200 can further include at least one of camera module, Bluetooth module, and digital broadcast receiver module.

Operations of the above structured mobile phone are described hereinafter particularly in association with a vibration code generation and transmission procedure, vibration code reception and vibration generation procedure, vibration information-inserted text message generation procedure, and incoming text message-based vibration output procedure.

Figure 3:
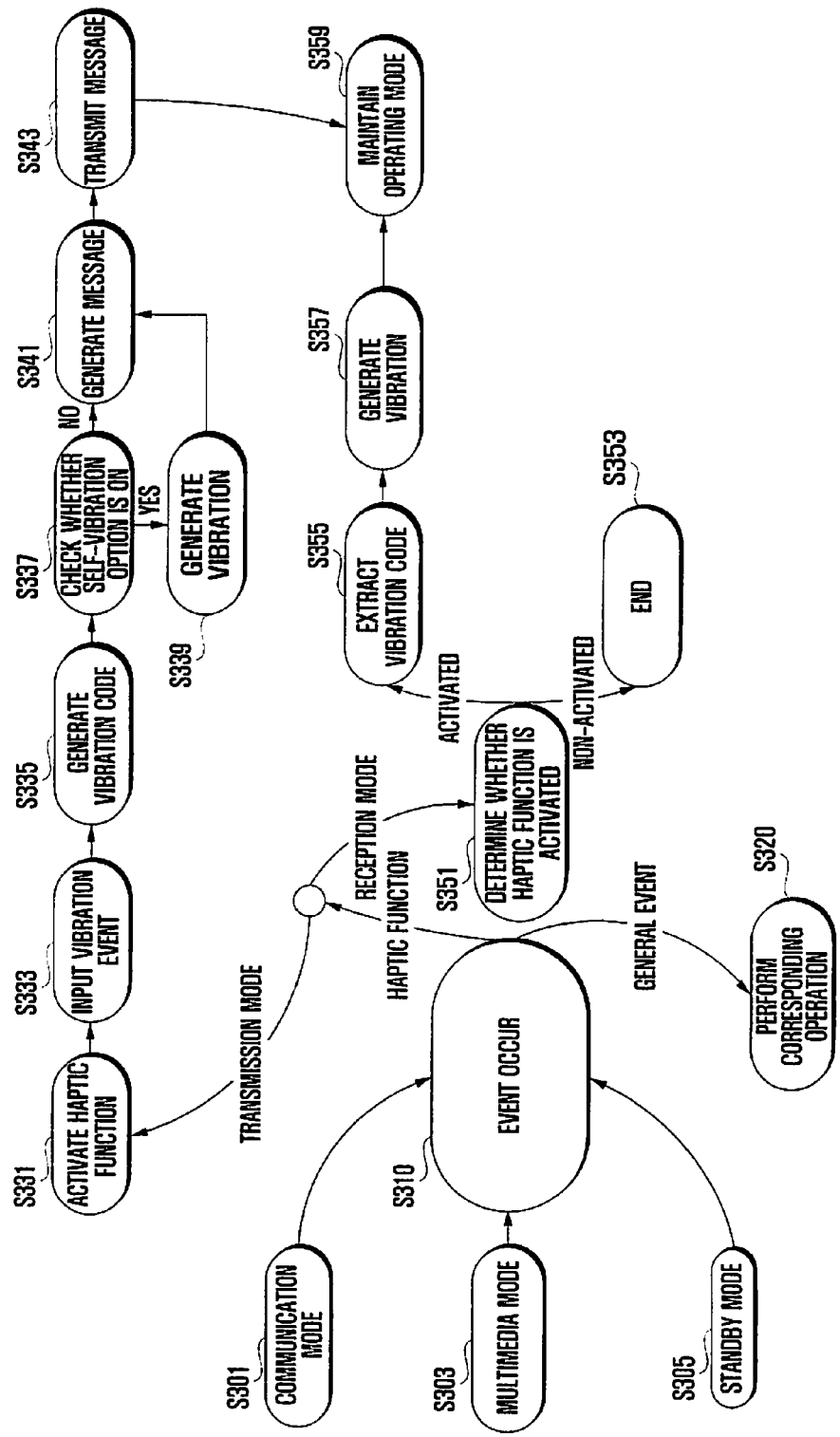
FIG. 3 is a state transition diagram illustrating state transitions of a mobile phone adopted by a haptic feedback system according to an embodiment of the present invention.

FIG. 3 is a state transition diagram illustrating state transitions of a mobile phone adopted by a haptic feedback system according to an embodiment of the present invention.

In FIG. 3, the mobile phone generates and transmits vibration information and outputs vibration in a specific operation mode.

In this embodiment, the specific operation mode can be a voice communication mode of step S301, a multimedia mode of step S303, and a standby mode of step S305. However, the haptic generation method of the present invention is not limited to the voice communication mode, multimedia mode, and standby mode, but can be applied to other available operation modes.

If an event occurs while operating in one of the communication mode, multimedia mode, and standby mode, the mobile phone detects the event in step S310. If the event is a general event such as communication termination, photo data save request, channel establishment request, and reception of text message, the mobile phone performs an operation corresponding to the generation event in step S320.

If a text message-related event is detected, the mobile phone checks whether the event has occurred by an incoming text message or outgoing text message. If it is determined that the event has occurred by an incoming text message, the mobile phone determines whether the text message is formatted with vibration information. If it is determined that the text message is formatted with vibration information, the mobile phone performs procedures for outputting a vibration.

In a case that the mobile phone is operating as a sending mobile phone, the mobile phone activates the haptic function in step S331 while maintaining the current operation mode and detects a vibration event in step S333. If vibration event is detected, the mobile phone analyzes the vibration event and generates a vibration code in step S335. Here, the vibration event can be one of touch events or key events.

The touch events can be classified into rubbing, touching, and circling as shown in Table 1. The key events occur by pushing number key provided by the input unit of the mobile phone. Next, the mobile phone determines whether a self-vibration option is on in step S337. If the self-vibration option is on, the mobile phone outputs vibration matched to the vibration code in step S339 and generates a control message containing the vibration code in step S341. On the other hand, if the self-vibration option is off, the mobile phone skips step S339 and generating the control message containing the vibration code in step S341. The control message can be a SMS message or MMS message.

Here, the order of steps S337 to S341 can be changed. That is, steps S337 and S339 can be skipped, and step S341 can be arranged before step S337 or S339.

Next, the mobile phone transmits the control message to at least one destination mobile phone in step S343. At this time, the control message can be transmitted in different manners according to the current operation mode of the mobile phone. For example, the control message is transmitted through a traffic channel established by means of the CMS in a voice communication mode. In the case that the mobile phone operates in the multimedia communication mode so as to present a photo received from a counterpart mobile phone, the mobile phone can extract destination information (for example, the phone number or caller ID of the counterpart mobile phone) and transmit the control message on the basis of the destination information. In the case that the mobile phone operates in a multimedia mode or standby mode, the mobile phone transmits the control message to a destination address (i.e., the phone number of the recipient mobile phone) input by the user.

After completing the transmission of the control message, the mobile phone maintains the current operation mode in step S359.

In a case that the mobile phone operates as a receiving mobile phone, the mobile phone determines whether the haptic function is activated in step S351 while maintaining its current operation mode, i.e. one of the communication mode, multimedia mode, and standby mode. If the haptic function is not activated, the mobile phone ignores the vibration event so as to disable the vibration related functions in step S353.

If the haptic function is activated, the mobile phone performs parsing on the control message received from another mobile phone and analyzes the vibration code contained in the received control message. Next, the mobile phone retrieves vibration pattern matched to the vibration code from the mapping table as Table 1 and outputs vibration according to the retrieved vibration pattern in step S357. Finally, the mobile phone returns to maintain the current operation mode.

Although the haptic function is described in association with vibration code and control message in the communication mode, the present invention is not limited thereto. For example, the haptic generation method can be applied with a Dual Tone Multi Frequency (DTMF) technique.

Now, the operation of the mobile phone for providing the haptic function is described hereinafter with reference to FIGS. 4 to 9 in mobile detail.

Figure 4:
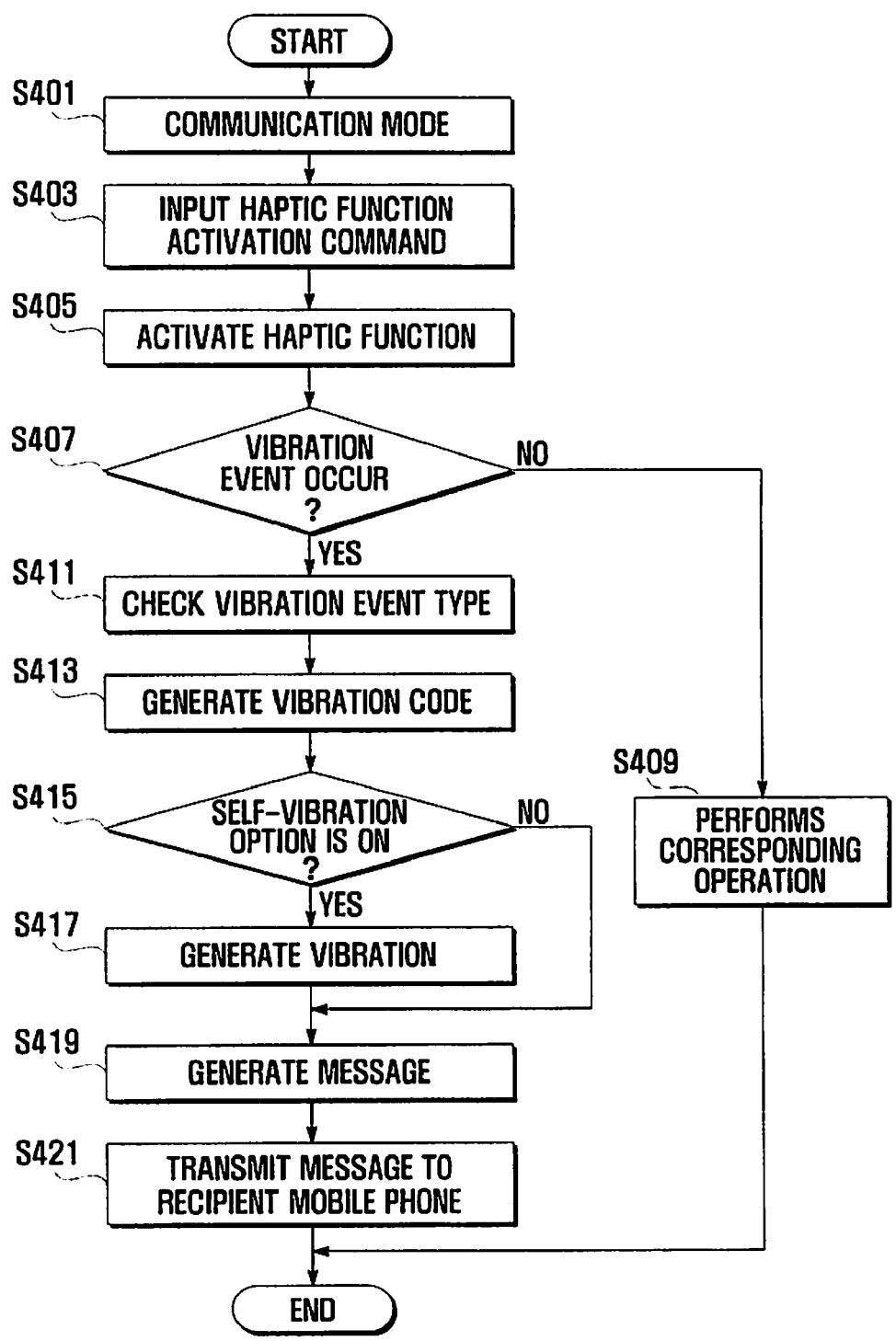
FIG. 4 is a flowchart illustrating a haptic generation method for a mobile phone according to an embodiment of the present invention.

FIG. 4 is a flowchart illustrating a haptic generation method for a mobile phone according to an embodiment of the present invention.

Referring to FIG. 4, the mobile phone is operating in a communication mode in step S401. The mobile phone monitors to detect a haptic function activation command while operating in the communication mode. If a haptic function activation command is detected in the communication mode in step S403, the mobile phone activates the haptic function and monitors to detect an event in step S405. If an event is detected during the communication session, the mobile phone detects whether the event is a vibration event in step S407.

If the event is not a vibration event, the mobile phone performs an operation corresponding to the event in step S409. In this embodiment, it is assumed that the event is a detection of a communication mode termination command. Accordingly, if the communication mode termination command is detected at step S407, the mobile phone releases the communication channel and ends the communication session.

If the detected event is a vibration event, the mobile phone checks a type of the vibration event in step S411. As described above, the vibration event occurs by a touch behavior on a touchpad or touchscreen or a push on a key. Next, the mobile phone analyzes the type of the vibration event and generates a vibration code in step S413. Checking and analyzing the type of the vibration event type and generation the vibration code are performed with reference to a mapping table (see Table 1).

Next, the mobile phone determines whether a self-vibration option of the haptic function is on in step S415. If the self-vibration option is on, the mobile phone outputs a vibration in a vibration pattern matched to the vibration code in step S417. Next, the mobile phone generates a control message containing the vibration code in step S419 and transmits the control message to a counterpart mobile phone in step S421. If the self-vibration option is off, the mobile phone skips step S417.

Here, steps S415 and S417 can be omitted according to the configuration of the mobile phone or can be arranged after step S419.

The control message can be transmitted through a separate communication channel (for example, a traffic channel) supported by the CMS. The vibration code is selected from the mapping table (e.g., Table 1), and the control message can be a SMS message or MMS message. Also, the vibration code can be formatted as a control signal.

Preferably, the mobile phone maintains the communication mode even after the control message is transmitted.

Figure 5:
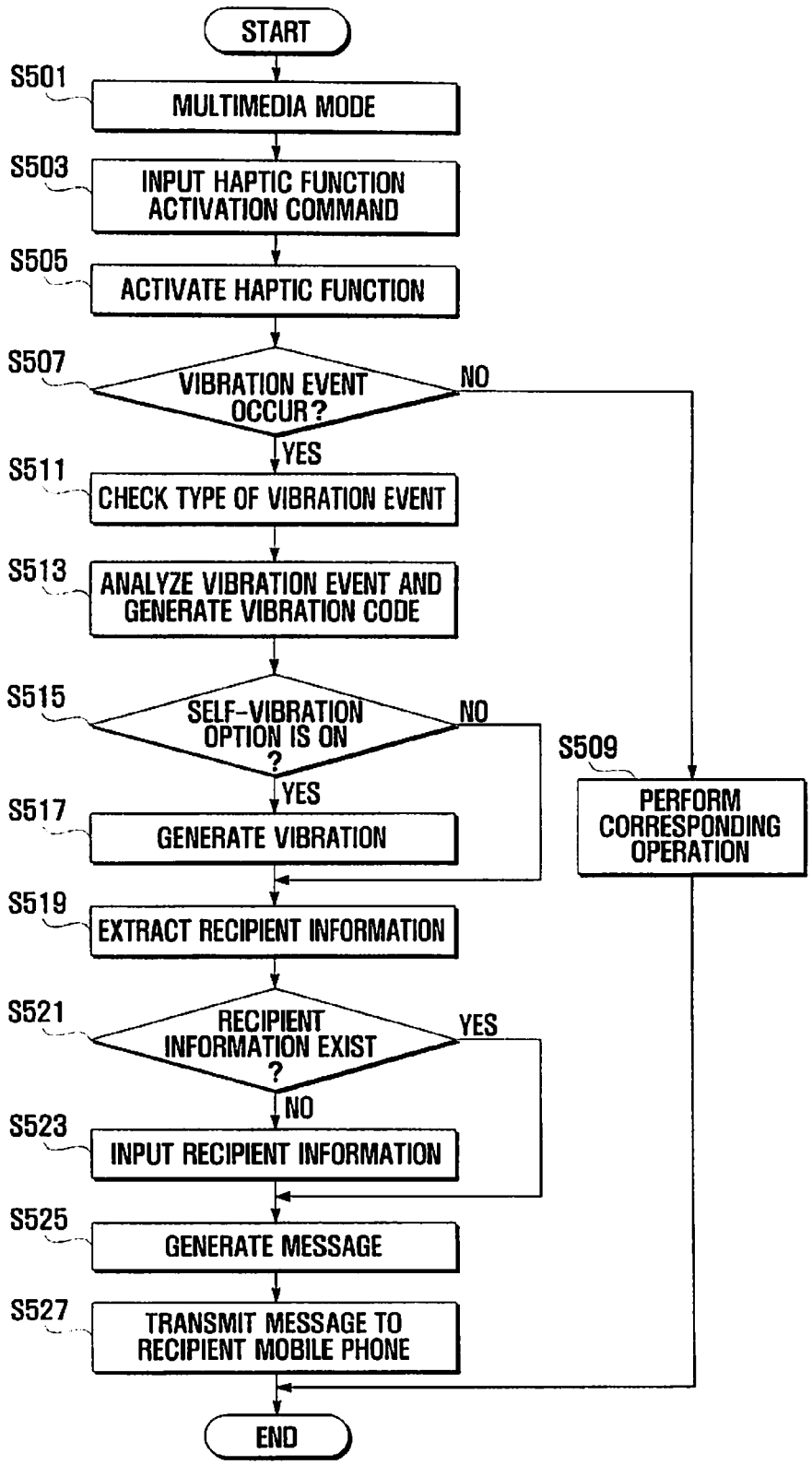
FIG. 5 is a flowchart illustrating a haptic generation method for a mobile phone according to an embodiment of the present invention.

FIG. 5 is a flowchart illustrating a haptic generation method for a mobile phone according to an embodiment of the present invention.

Referring to FIG. 5, the mobile phone is operating in a multimedia mode in step S501. In this embodiment, the multimedia mode is a picture view mode such that a picture is displayed on a screen. The mobile phone monitors to detect a haptic function activation command while operating in the multimedia mode. If a haptic function activation command is detected in step S503, the mobile phone activates the haptic function and monitors to detect an event in step S505. If an event is detected in the multimedia mode, the mobile phone detects whether the event is a vibration event in step S507. If the event is not a vibration event, the mobile phone performs an operation corresponding to the event in step S509. In this embodiment, it is assumed that the event is a detection of a multimedia mode termination command. Accordingly, if the multimedia mode termination command is detected at step S507, the mobile phone stops playing an ongoing multimedia content and ends the multimedia mode.

If the detected event is a vibration event, the mobile phone checks a type of the vibration event in step S511. As described above, the vibration event occurs by a touch behavior on a touchpad or touchscreen or a push on a key. Next, the mobile phone analyzes the type of the vibration event and generates a vibration code in step S513. Checking and analyzing the type of the vibration event type and generation the vibration code are performed with reference to a mapping table (see Table 1).

Next, the mobile phone determines whether a self-vibration option of the haptic function is on in step S515. If the self-vibration option is on, the mobile phone outputs a vibration in a vibration pattern matched to the vibration code in step S517.

Next, the mobile phone extracts recipient information associated with the multimedia content in step S519. The recipient information can be attached to the multimedia content when it is stored. If the recipient information is extracted, the mobile phone adds the recipient information to the multimedia content.

Next, the mobile phone determines whether recipient information is extracted in step S521. If recipient information is extracted, the mobile phone generates a control message having the recipient information in step S525. On the other hand, if no recipient information is extracted, the mobile phone receives recipient information through the input unit in step S523 and then generates control message having the recipient information in step S525. In order to generate the recipient information, the mobile phone presents a dialog box for asking for the user to input recipient information. Next, the mobile phone transmits the control message to at least one recipient mobile phone in step S527.

Preferably, the mobile phone performs a channel establishment process for transmitting the control message after the control message is generated.

Preferably, the mobile phone maintains the multimedia mode even after the control message is transmitted.

Although the haptic generation method is explained in association with the multimedia mode in FIG. 5, it can be provided in the standby mode of the mobile phone. For example, if the haptic function is activated while the mobile phone operates in the standby mode, the mobile phone can generate a control message containing a vibration code in response to the vibration event occurred by the user and transmits the control message to at least one recipient mobile phone.

Figure 6:
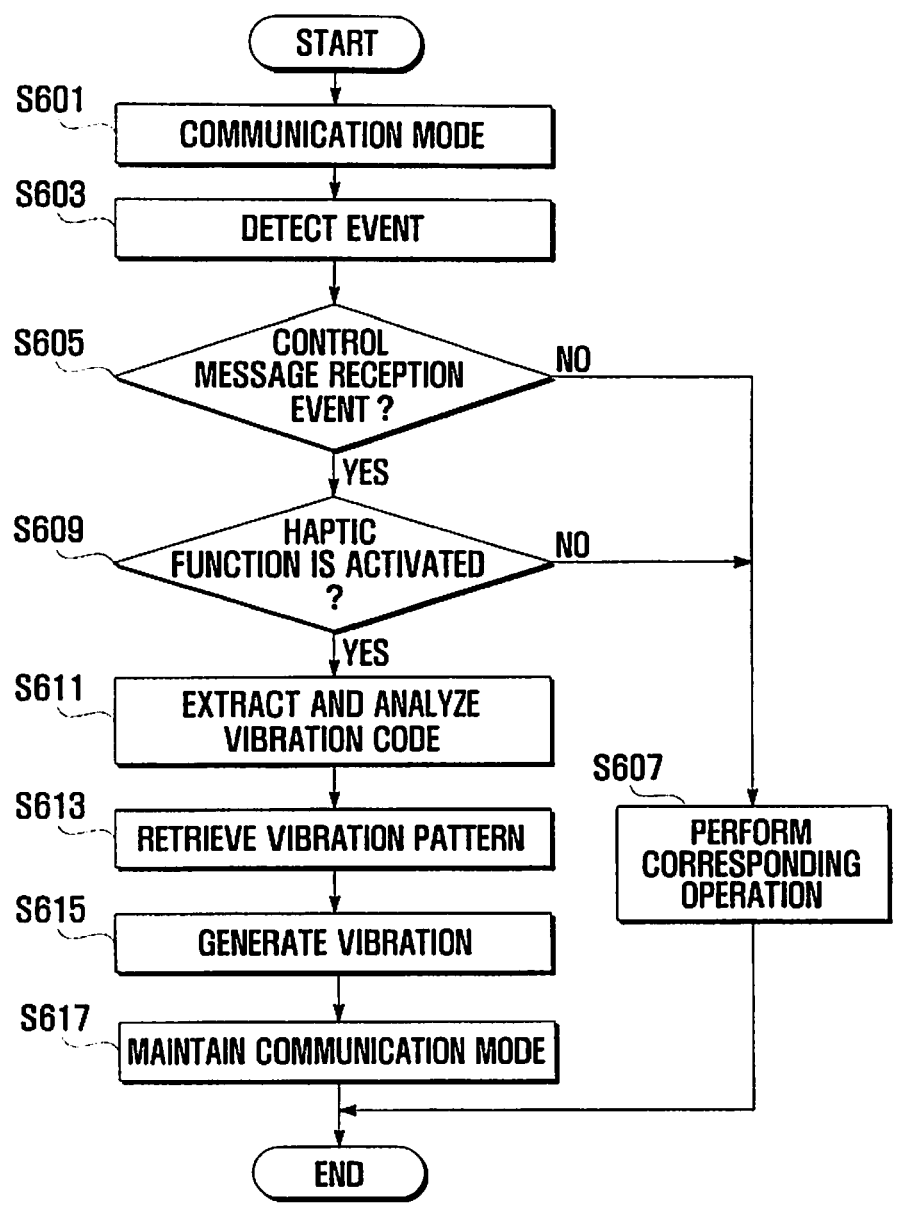
FIG. 6 is a flowchart illustrating a haptic generation method for a mobile phone according to an embodiment of the present invention.

FIG. 6 is a flowchart illustrating a haptic generation method for a mobile phone according to an embodiment of the present invention. In this embodiment, the mobile phone receives a control message while operating in a communication mode.

Referring to FIG. 6, the mobile phone is operating in a communication mode in step S601. The mobile phone monitors to detect an event while operating in the communication mode. If an event occurs in step S603, the mobile phone detects the event and determines whether the event has occurred by a control message containing a vibration code in step S605. For example, if a text message is received during a communication session with a counterpart mobile phone, the mobile phone checks whether the text message includes a vibration code. The mobile phone can perform parsing on the header of the text message for determining whether a vibration code is carried by the text message. The vibration code can be received in the form of a specific command.

If the event has not occurred by a control message, the mobile phone performs an operation corresponding to the event in step S607. In this embodiment, it is assumed that the event is a detection of a communication mode termination command. Accordingly, if the communication mode termination command is detected at step S605, the mobile phone releases the communication channels and ends the communication session.

If the event has occurred by a control message, the mobile phone determines whether the haptic function is activated in step S609. If the haptic function is not activated, the mobile phone performs step S607.

If the haptic function is activated, the mobile phone extracts the vibration code from the control message and analyzes the extracted vibration code in step S611. That is, the mobile phone retrieves a matched vibration code from the mapping table (see Table 1). Next, the mobile phone retrieves a vibration pattern mapped to the vibration code in step S613.

Next, the mobile phone generates a vibration according to a vibration pattern mapped to the retrieved vibration code in step S615 and maintains the communication mode in step S617.

Figure 7:
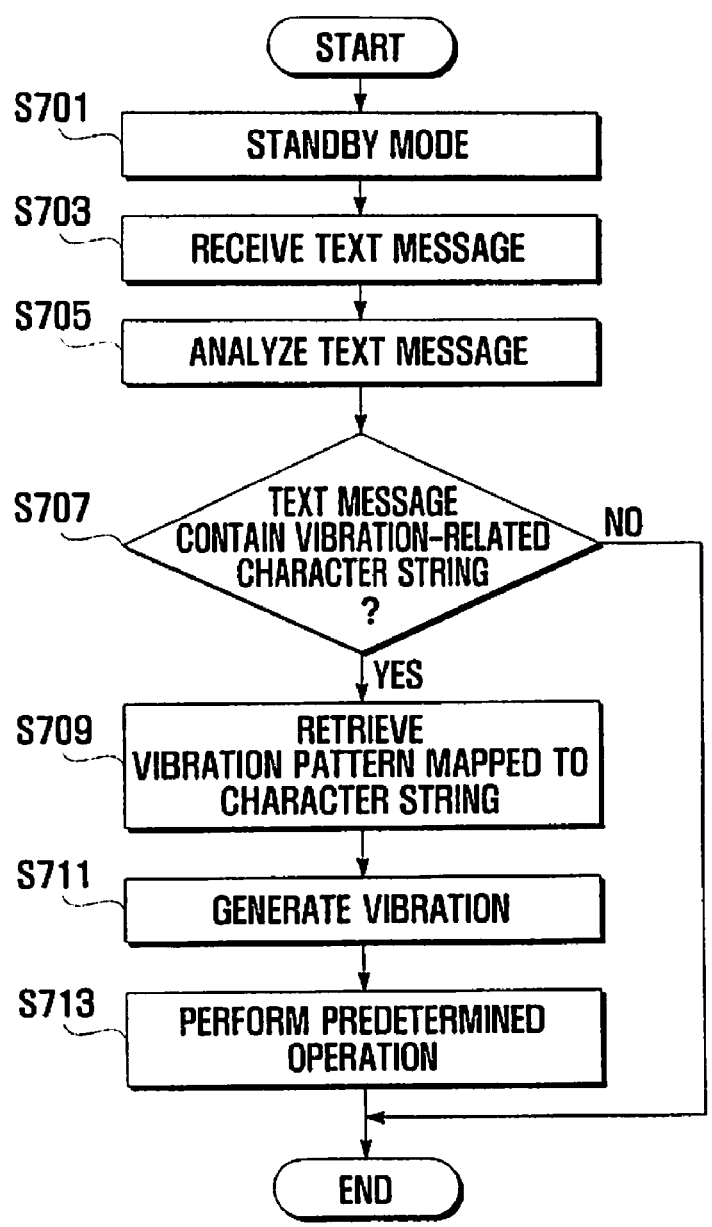
FIG. 7 is a flowchart illustrating a haptic generation method for a mobile phone according to an embodiment of the present invention.

FIG. 7 is a flowchart illustrating a haptic generation method for a mobile phone according to an embodiment of the present invention. In this embodiment, the haptic generation method is described in association with a mobile phone operating in the standby mode. However, the present invention is not limited thereto.

Referring to FIG. 7, the mobile phone is operating in a standby mode in step S701. The mobile phone monitors to detect an event while operating in the standby mode. If a text message is received, the mobile phone detects the reception of the text message as an event in step S703 and analyzes the received text message in step S705. That is, the mobile phone determines whether the text message contains a vibration code or a character string or an emoticon registered to its mapping table. In this embodiment, the haptic generation method is described with an example in which a text message containing a character string mapped to a vibration code for outputting a vibration is received in the standby mode.

After completing the text message analysis, the mobile phone determines whether the text message contains a character string mapped to a vibration code in step S707. For this purpose, the mobile phone compares the character strings contained in the text message to reference character strings registered to the mapping table (see Table 1).

If it is determined that the text message contains a character string registered to the mapping table, the mobile phone retrieves a vibration pattern matched to the character string from the mapping table in step S709 and outputs a vibration according to the vibration pattern in step S711. Next, the mobile phone performs an operation supposed to follow the output of the vibration in step S713. For example, the mobile phone displays the content of the text message after outputting the vibration.

The mobile phone can be configured to vibrate when the character string is displayed on the screen. Preferably, the vibration is output before displaying the content of the text message such that the user can expect an appearance of a specific character string. The vibration can be output in different patterns depending on the characteristic string and as many times as the number of the registered character strings contained in the text message.

Although not shown in FIG. 7, the haptic generation method can further include steps of determining whether the haptic function is activated and activating, if not activated, the haptic function. The haptic function can be configured such that the user selects whether to output the vibration even when the haptic function is activated.

How to display the text message and output the vibration is described hereinafter in more detail.

If a text message is received and a message display command is input by the user, the mobile phone displays the character strings of the text message in a sequential order. For example, the text message can be displayed in the form of a sliding text.

While the text message is sliding across the screen, the mobile phone checks the character strings of the text message and outputs, if a registered character string is detected, a vibration in a vibration pattern/level mapped to the registered character string.

Now, a text message generation and transmission procedure is described hereinafter.

If a text message composition command is input by the user, the mobile phone displays a message composition screen such that the user can write a text message by manipulating the input unit of the mobile phone. The text message can include words, specific character strings, and emoticons.

During the composition of the text message, the user can set vibration information with a specific character string. For example, after inputting a character string, vibration information (vibration pattern/level) is mapped to the character string. The vibration information can be mapped to multiple character strings with different vibration patterns and levels in a text message.

If the message composition is completed, the mobile phone detects the completion of the text message and allows the user to input destination information of at least one recipient mobile phone. Finally, the mobile phone transmits the text message to the at least one recipient mobile phone in response to a transmission command input by the user.

The recipient mobile phone receives the text message and displays the text message in response to a message read command input by its user. At this time, the mobile phone can be configured to display the text message in a sliding manner or scrolling. The text message can be composed of words, character strings, and emoticons.

Next, the recipient mobile phone detects whether the text message includes vibration information (vibration pattern/level) set for specific strings. If vibration information is detected, the recipient mobile phone outputs a vibration in the vibration pattern/level indicated by the vibration information at the time when the character string appears on the screen.

The vibration information is set for multiple character strings in a single text message. In this case, the vibration information is set with different patterns and levels for the different character strings such that the mobile phone outputs vibration in vibration pattern/level as they appear.

Figure 8:
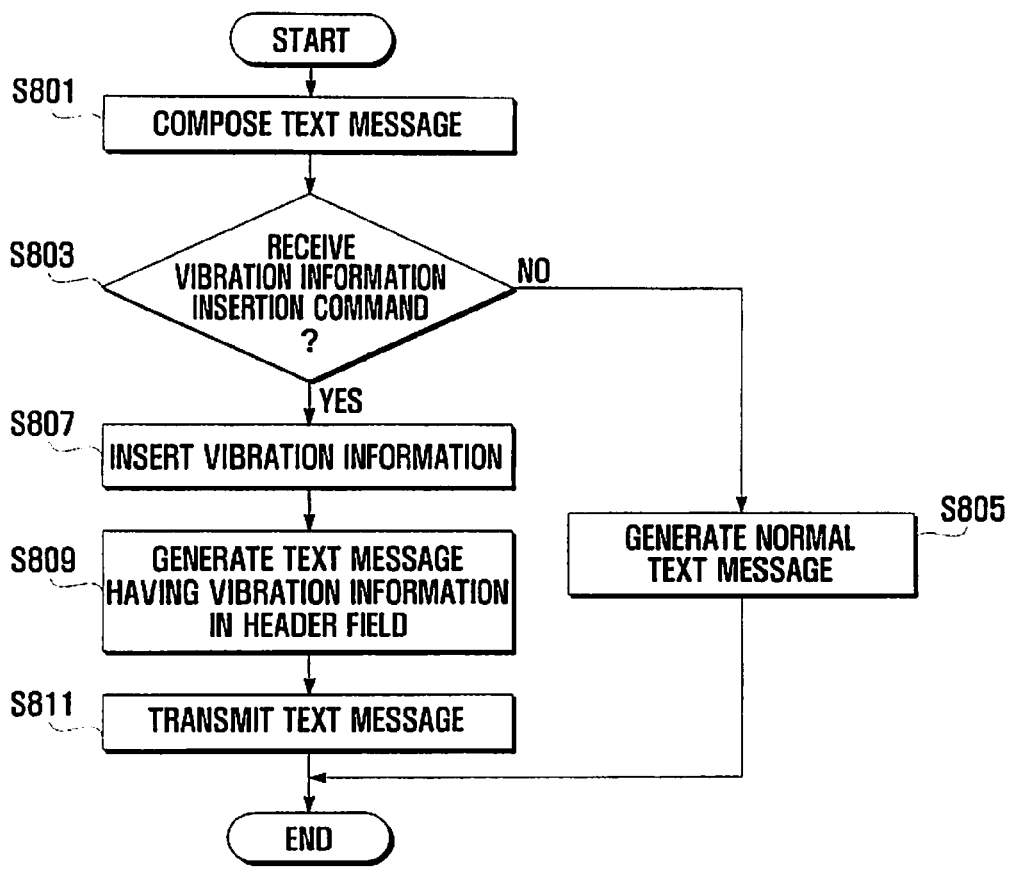
FIG. 8 is a flowchart illustrating a text message transmission procedure of a haptic generation method according to an embodiment of the present invention.

FIG. 8 is a flowchart illustrating a text message transmission procedure of a haptic generation method according to an embodiment of the present invention.

Referring to FIG. 8, the mobile phone composes a text message according to the user's input in step S801. The mobile phone determines whether a vibration information insertion command is input while compositing the text message in step S803. For example, the user can insert vibration information for expressing any emotion after completion of the message writing. In order for the user to insert vibration information, the mobile phone can provide a vibration information input interface in response to the vibration information insertion command.

If no vibration information insertion command is detected, the mobile phone generates a normal text message without addition of vibration information in step S805. The normal text message generation can be performed in response to a message composition complete command.

If a vibration information insertion command is detected, the mobile phone receives vibration information input through the vibration information input interface in step S807.

If vibration information is input, the mobile phone generates a text message by inserting the vibration information into a header or a predetermined field of the text message format and filling the composed text within the data field of the text message format in step S809.

Next, the mobile phone transmits the text message to a recipient mobile phone in step S811. Although not shown in FIG. 9, the mobile phone provides a destination information input interface for allowing the user to input at least one phone number.

The vibration information can be added to the text message in the form of a vibration code or a command code. In the case that a command code is inserted to the text message, the recipient mobile phone outputs a vibration for alarming the reception of the text message.

Figure 9:
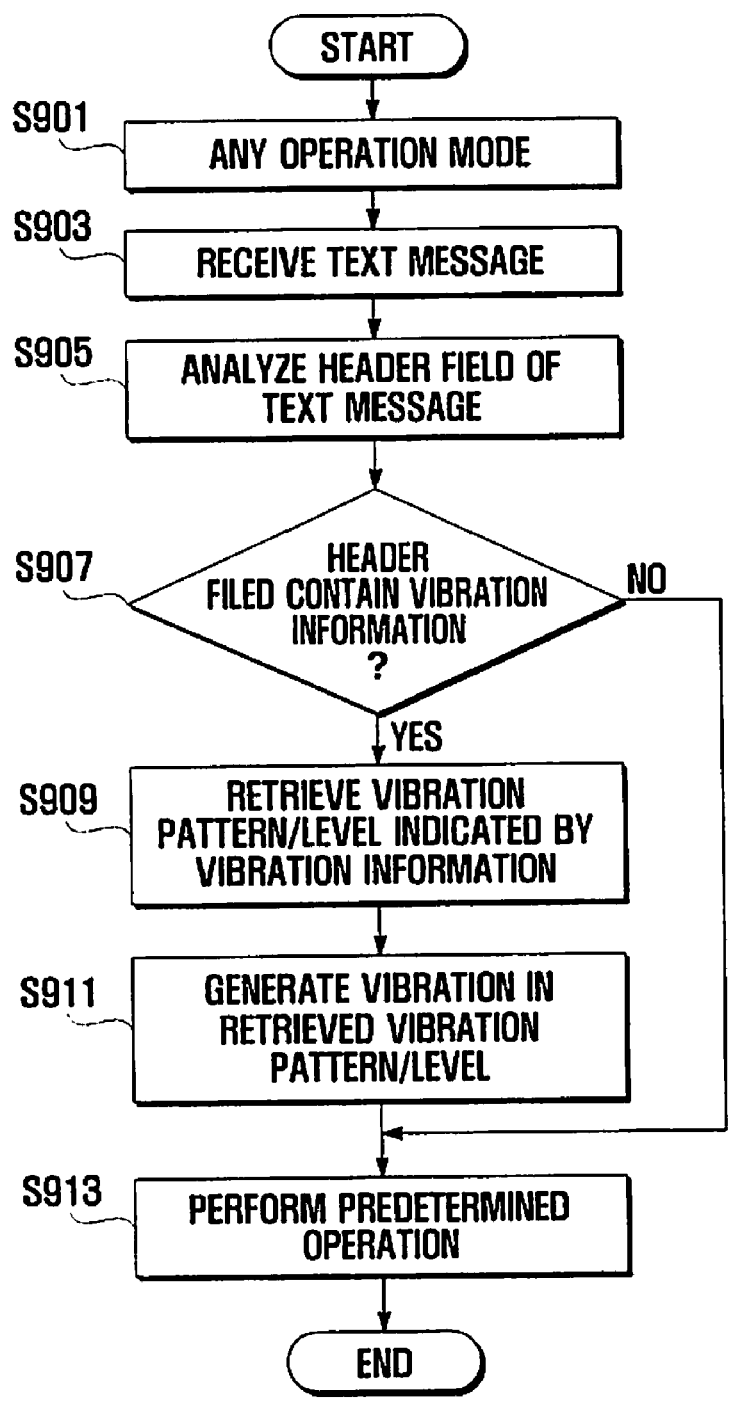
FIG. 9 is a flowchart illustrating a vibration output procedure of a haptic generation method according to an embodiment of the present invention.

FIG. 9 is a flowchart illustrating a vibration output procedure of a haptic generation method according to an embodiment of the present invention.

Referring to FIG. 9, the mobile phone is operating in an operation mode in step S901. If a text message is received in step S903, the mobile phone analyzes a header field of the text message in step S905.

Next, the mobile phone determines whether the header contains vibration information in step S907.

That is, the mobile phone performs parsing on the header of the text message and determines whether vibration information exists in the header. If vibration information exists in the header, the mobile phone retrieves a vibration pattern/level indicated by the vibration information from a mapping table (see Table 1). The vibration information can be inserted in the form of a vibration code or an identifier (ID) for indicating a vibration pattern/level.

If the header contains no vibration information, the mobile phone displays the content of the text message without vibration output in step S913.

If the header contains vibration information, the mobile phone retrieves the vibration pattern and/or level matched to the vibration information from the mapping table in step S909.

Next the mobile phone outputs a vibration in the retrieved vibration pattern and/or level in step S911 and then performs a predetermined operation in step S913. For example, the mobile phone displays the content of the text message after outputting the vibration.

By transmitting the text message with specific vibration information, the recipient can guess what the sender wants to express according to the type of the vibration output on the basis of the vibration information.

For example, if a user completes writing a text and sets vibration information for expressing anger, the mobile phone generates a text message having a header containing the vibration information and a data field containing the text, and then transmits to a recipient mobile phone.

Upon receiving the text message, the recipient mobile phone outputs a vibration for alarming the reception of the text message. At this time, the recipient mobile phone performs parsing on the header of the received text message for checking the vibration information contained in the header. If no vibration information is contained in the header, the mobile phone alarms a reception of normal text message using an alarming tone or alarming vibration. If vibration information is contained in the header, the mobile phone outputs a vibration for alarming a vibration-embedded text message. In more detail, the recipient mobile phone retrieves a vibration pattern/level indicated by the vibration information from the mapping table and outputs the vibration in the vibration pattern/level. Since the vibration information is set for expressing anger at the sending mobile phone, the recipient mobile phone retrieves the vibration pattern/level matched to anger form the mapping table (see Table 1) an outputs the vibration in the pattern/level for expressing anger.

Accordingly, the recipient can recognize the sender's emotion with the type of vibration of the mobile phone before reading the content of the received text message.

Although a mapping table is used for determining the type of the vibration, the present invention is not limited thereto. For example, the types of vibrations can matched to predetermined command codes such that the recipient mobile phone can determines the vibration type on the basis of the command code carried by the text message.

Although not shown in FIG. 9, the mobile phone checks whether the haptic function is activated. When the haptic function is not activated, the mobile phone does not alarm the reception of the text message with vibration.

In order for the haptic function to operate normally, the sending mobile phone and receiving mobile phone should maintain their mapping table identically. Preferably, the mapping table is editable such that records can be added, deleted, and modified. The mapping table can be downloaded from a web server.

While the invention has been described with reference to certain preferred embodiments thereof, it will be understood by those skilled in the art that various changes in form and detail may be made therein without departing from the spirit and scope of the present invention, as defined in the appended claims.

As described above, the haptic generation method and system for a mobile phone according to the present invention is advantageous in enriching communication with tactile feelings as well as visual and auditory expressions.

Also, the haptic generation method and system for a mobile phone according to the present invention allows a text message to carry a vibration code indicating a vibration pattern/level, whereby it is possible to express a user's emotional state to a recipient with a specific vibration reflecting the emotional state, resulting in enrichment of communication.

Also, the haptic generation method and system for a mobile phone according to the present invention make possible to transmit a user's emotion to a recipient by embedding vibration code indicating an emotion in a text message, whereby the recipient can share the feeling of the sender by means of vibration indicated by the vibration code of a received text message.

Furthermore, the haptic generation method and system for a mobile phone according to the present invention are capable of setting a specific character string with vibration information implying user's emotion in a text message such that a recipient mobile phone outputs a vibration for expressing the implied emotion when the character string appear on the screen, thereby sharing emotions through telecommunication.

What is claimed is:

1. A haptic generation method for a mobile phone, comprising the steps of:

detecting a vibration event in a specific operation mode;

retrieving a vibration code corresponding to the vibration event from a mapping table, the vibration code being a command code defining a vibration pattern and level;

generating a specific message containing the vibration code;

transmitting the specific message to at least one destination mobile phone; and maintaining the specific operation mode, wherein the specific operation mode is one of a communication mode, a multimedia mode and a standby mode, and the specific message is one of a control message and a text message, and wherein the control message is transmitted through a separate channel provided by means of a concurrent multiple service, and the text message is transmitted through a communication channel and comprises a header including a vibration method and a data field including a composed text.

2. The haptic generation method of claim 1, further comprising:
determining whether a self-vibration option is switched on; and
outputting a vibration corresponding to the vibration code, when the self-vibration option is switched on.

3. The haptic generation method of claim 1, further comprising determining whether a haptic function is activated in association with an ongoing operation mode.

4. The haptic generation method of claim 1, further comprising:
detecting the vibration event in the multimedia mode;
retrieving a vibration pattern and a vibration level corresponding to the vibration event;
checking recipient information of an ongoing playback multimedia file; and
transmitting the multimedia file containing information on the vibration pattern and the vibration level to a recipient mobile phone on the basis of the recipient information.

5. The haptic generation method of claim 1, further comprising:
detecting a vibration information insertion command in a text message composition mode;
requesting input of vibration information, when the vibration information insertion command is detected;
generating the text message containing vibration information inputted by a user; and
transmitting the text message to at least one recipient mobile phone.

6. A vibration generation method for a mobile phone, comprising the steps of:
receiving a text message in a specific operation mode, the text message comprising a header including a vibration method and a data field including a composed text;
displaying a character string carried by the text message in a sliding manner in response to a read command;
checking whether the character string contains at least one character string registered to a mapping table; and
generating and outputting a vibration in a vibration pattern and level defined by a command code and mapped, by way of a vibration code from a mapping table, to the at least one registered character string at a time when the character string appears on a screen, when at least one registered character string is detected,
wherein the specific operation mode is one of a communication mode, a multimedia mode and a standby mode.

7. The vibration generation method of claim 6, wherein generating a vibration comprises:
retrieving vibration information mapped to the registered character string from the mapping table; and
outputting the vibration in a vibration pattern and level indicated by the vibration information.

8. The vibration generation method of claim 7, further comprising determining whether a haptic function is activated.

9. The vibration generation method of claim 6, further comprising maintaining the operation mode after generating the vibration.

10. A haptic generation method for a mobile phone, comprising the steps of:
setting, at a sending mobile phone, vibration information on at least one character string of a text while generating a text message that comprises a header including a vibration method and a data field including a composed text;
transmitting, at the sending mobile phone, the text message to a receiving mobile phone;
receiving, at the receiving mobile phone in a specific operation mode, the text message;
displaying, at the receiving mobile phone, the text of the text message in response to a message reading command;
extracting, at the receiving mobile phone, the vibration information set for the at least one character string; and
generating and outputting, at the receiving mobile phone, a vibration in a vibration pattern and level indicated by the vibration information and defined by a command code, the vibration information being mapped, from a mapping table, to at least one character string registered to the mapping table at a time when the character string appears on a screen,
wherein the specific operation mode is one of a communication mode, a multimedia mode and a standby mode.

11. The haptic generation method of claim 10, wherein displaying the text comprises:
presenting character strings constituting the text in a sequential order; and
outputting the vibration at a time when the at least one character string on which the vibration information is set appears.

12. The haptic generation method of claim 11, wherein the vibration information indicates different vibration patterns and levels depending on the character string.

13. A haptic generation method for a mobile phone, comprising the steps of:
receiving a text message in a specific operation mode, the text message comprising a header including a vibration method and a data field including a composed text;
determining whether vibration information is contained in a header of the text message; and
outputting a vibration for alerting a reception of the text message according to a vibration pattern and level indicated by the vibration information, when vibration information is contained in the header,
wherein the specific operation mode is one of a communication mode, a multimedia mode and a standby mode, and the vibration information is mapped from a mapping table and is a command code defining a vibration pattern and level.

14. A mobile phone comprising:
a radio frequency unit for establishing communication channel with an access network for exchanging voice, text message, and a vibration code corresponding to a vibration event, the vibration code being a command code defining a vibration pattern and level;
an input unit for receiving control commands associated with a haptic generation function and a touch input or key input for generating vibration event;
a memory unit for storing data generated by a haptic application program and parameters associated with the haptic generation function;
a vibration driving unit for generating a vibration corresponding to the vibration event; and
a control unit for generating a specific message containing the vibration code when the vibration event is detected in a specific operation mode and transmitting the specific message to at least one recipient mobile phone, and for generating a vibration mapped, by way of a vibration code from a mapping table, to the specific message when the specific message is received in the specific operation mode, wherein the specific operation mode is one of a communication mode, a multimedia mode and a standby mode, and the specific message is one of a control message and a text message, the text message comprising a header including a vibration method and a data field including a composed text.

15. The mobile phone of claim 14, wherein the control unit controls retrieving a vibration code corresponding to the vibration event, generating the control message containing the vibration code, and transmitting the control message to the recipient mobile phone.

16. The mobile phone of claim 15, wherein the control unit controls generating the text message by inserting the vibration code into a header of the text message and a text input into a data field of the text message by means of the input unit, and transmitting the text message to at least one recipient mobile phone.

17. The mobile phone of claim 15, wherein the control unit extracts a vibration code from the text message and controls generating the vibration in a vibration pattern and level matched to the vibration code, when a text message is received.

18. The mobile phone of claim 15, wherein the control unit displays a text of the text message in a sliding manner in response to a read command when the text message is received, and generates a vibration in a vibration pattern and level mapped to the registered character string when a previously registered character string appears.

19. The mobile phone of claim 15, wherein the control unit generates the text message having at least one pre-registered character string and vibration information, and transmits the text message to at least one recipient mobile phone in response to user commands.

20. The mobile phone of claim 17, wherein the control unit checks whether vibration information is contained in a header of the text message when the text message is received, and alerts a reception of the text message by outputting a vibration in a vibration pattern and level indicated by the vibration information when vibration information is contained.

* * * * *